UNITED STATES PATENT OFFICE.

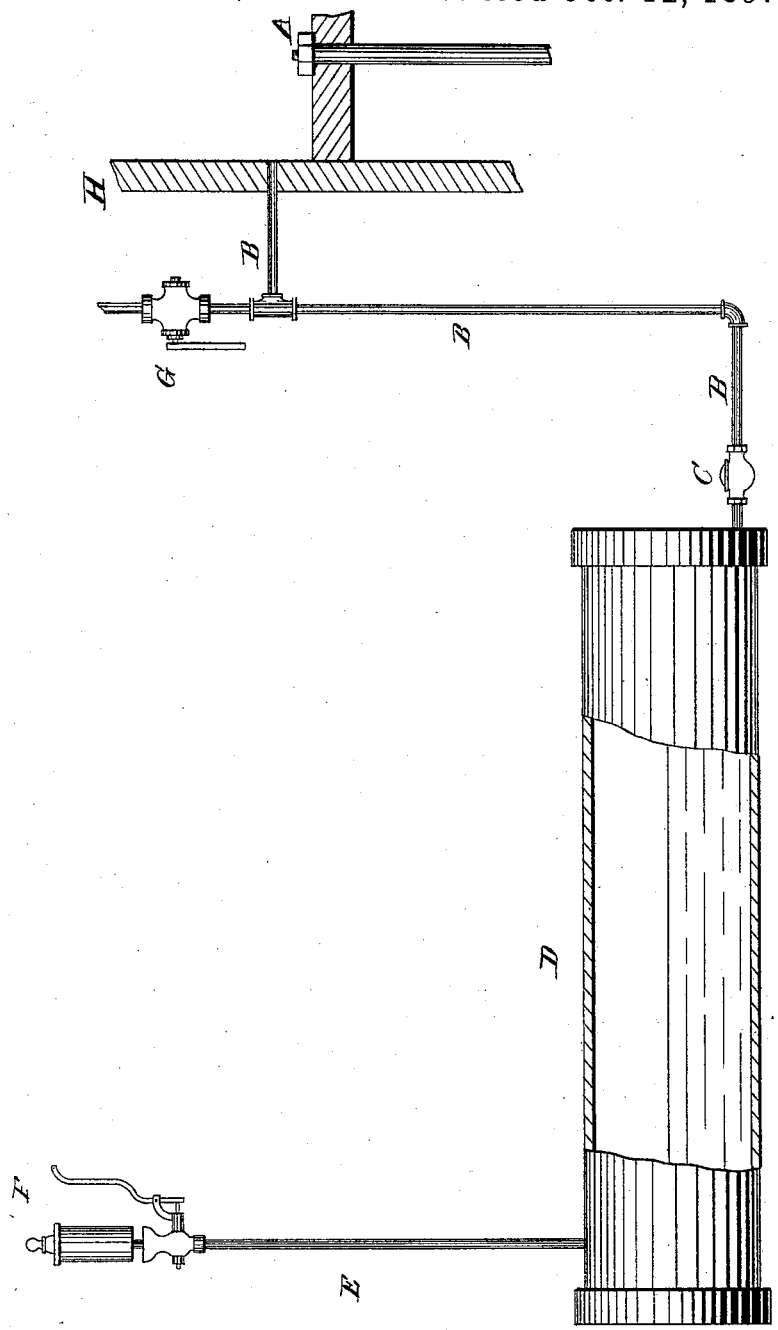

GEORGE FREDERICK ARP, OF SPIRIT LAKE, IOWA.

WHISTLE FOR GAS OR GASOLENE ENGINES.

SPECIFICATION forming part of Letters Patent No. 591,521, dated October 12, 1897.

Application filed November 24, 1896. Serial No. 613,273. (No model.)

*To all whom it may concern:*

Be it known that I, GEORGE FREDERICK ARP, a citizen of the United States, residing at Spirit Lake, in the county of Dickinson and State of Iowa, have invented a new and useful Apparatus for and Method of Applying a Whistle to a Gas or a Gasolene Engine; and I do hereby declare that the following is a full, clear, and accurate description of the invention, which will enable others skilled in the art to which it pertains to use the same.

Heretofore gas and gasolene engines have not to my knowledge been equipped with whistles, as steam-engines have, and consequently have been at certain disadvantages in regard to making signals. This is especially true in regard to gasolene-launches, which are unable to make whistle-signals, as prescribed by law for steamboats, and this inability to and necessity for making whistle-signals was the cause that led to this invention.

The object of my invention is to produce a whistling apparatus for a gas or a gasolene engine that will work satisfactorily, is simple in construction, does not require much room, and can be produced at a reasonable cost; and to this end my invention consists of a tank which is connected directly to the cylinder of a gas or a gasolene engine by a small pipe fitted with a check-valve. To the top of the tank is fitted an ordinary steam-whistle with valve by a suitable pipe.

The figure of drawing represents a vertical elevation of my device, parts of the same being broken away, in which—

A represents the piston of a gas or a gasolene engine in the cylinder H. When the piston is at the top, it compresses the gas above it, which is then ignited and expanded, driving the piston to the opposite end of the cylinder. When the piston has passed the opening of the small pipe B, a portion of the gas escapes through it into the tank D, where it is retained by the check-valve C. After repeating this process a few times the pressure of the gas in the tank D will be equal to that in the cylinder H, but for obvious reasons cannot rise above it. Hence it is perfectly safe from explosions. The whistle F can then be operated at pleasure in the usual manner. The small pipe B is screwed into the opening in the cylinder vacated by the relief or starting valve and a stop-cock G fitted to the pipe, as shown. This stop-cock is always to be kept closed except when starting the engine. Keeping this stop-cock always closed of course does not refer to the engine when not in operation. The tank D here consists of a piece of iron pipe, with the ends closed with screw-caps, and the small pipe B, leading through one end close to the bottom, so that its outlet may be submerged by water contained in the tank D. The depth of this water is just sufficient to submerge the outlet of the pipe B, and its object is to purify the gas by taking out the grease, soot, and other impurities which would tend to gum and clog the whistle. In the same end and on the same level with outlet of the pipe B a drain-cock could be fitted, if desired, to drain off the water to prevent freezing, &c.

I do not wish to confine myself to the form of tank here described and illustrated, but to use any other form or shape desired and made of any material desired. It would be impossible to name or illustrate all the forms that might be employed for the purpose.

Having fully described my invention, I hereby claim and desire to secure by Letters Patent—

In a gas-engine, the whistle F, pipe E, water-pipe D, and the piping B, the latter provided with check-valve C and stop-cock G, in combination with the engine-cylinder, all constructed and arranged substantially as shown and described.

GEORGE FREDERICK ARP.

Witnesses:
   J. B. THOMPSON,
   H. E. WHITE.